United States Patent
Kiesel et al.

[11] Patent Number: 6,129,358
[45] Date of Patent: Oct. 10, 2000

[54] UNIDIRECTIONAL ROD SEALING RING FOR A HYDRAULIC CYLINDER

[75] Inventors: Mark J. Kiesel; Anthony D. Friend, both of Peoria, Ill.

[73] Assignee: Caterpillar Inc., Peoria, Ill.

[21] Appl. No.: 08/997,582

[22] Filed: Dec. 23, 1997

[51] Int. Cl.⁷ .................................. F16J 9/20; F16J 9/28
[52] U.S. Cl. .................. 277/436; 277/448; 277/465; 277/582; 277/584; 277/928
[58] Field of Search ................... 277/448, 465, 277/579, 582, 584, 436, 552, 928

[56] References Cited

U.S. PATENT DOCUMENTS

| | | |
|---|---|---|
| 3,214,182 | 10/1965 | Herbruggen . |
| 3,810,639 | 5/1974 | Scannell . |
| 3,814,553 | 6/1974 | Hubschmann . |
| 4,157,833 | 6/1979 | Kozlowski . |
| 4,256,318 | 3/1981 | Bush . |
| 4,323,427 | 4/1982 | Jamrus . |
| 4,458,717 | 7/1984 | Boland . |
| 4,472,111 | 9/1984 | Yamatani . |
| 4,501,429 | 2/1985 | White . |
| 4,594,938 | 6/1986 | Shore ........................................ 92/82 |
| 4,623,151 | 11/1986 | Kashiwamura et al. . |
| 4,893,823 | 1/1990 | Strouse et al. . |
| 4,907,495 | 3/1990 | Sugahara . |
| 5,088,745 | 2/1992 | Peppiatt et al. . |
| 5,143,382 | 9/1992 | Maringer . |
| 5,169,162 | 12/1992 | Azaml et al. . |

FOREIGN PATENT DOCUMENTS 1168508  6/1967  United Kingdom ............. F16J 15/16

Primary Examiner—Anthony Knight
Assistant Examiner—John L. Beres
Attorney, Agent, or Firm—Haverstock Garrett & Roberts

[57] ABSTRACT

A unidirectional rod sealing ring adapted for forming a sealed condition in association with a member such as a piston rod or shaft axially movable in a bore of a hydraulic cylinder, the sealing ring including an elastomeric ring member having an axially facing sealing face, an opposite axially facing pressure face, a circumferential radial outer surface, and a circumferential radial inner surface, the elastomeric ring member being cooperatively receivable in an annular groove around the bore of a hydraulic cylinder with the sealing face in position in opposed relation to a first axial groove wall, and the pressure face positioned in opposed relation to an opposite second groove wall, the sealing face including at least one continuous annular bead of relatively small radial extent positioned for sealably engaging the first axial groove wall, and the radial inner surface including an inner most circumferential lip of relatively small axial extent positioned for circumferential sealed engagement with the member axially movable in the bore.

6 Claims, 1 Drawing Sheet

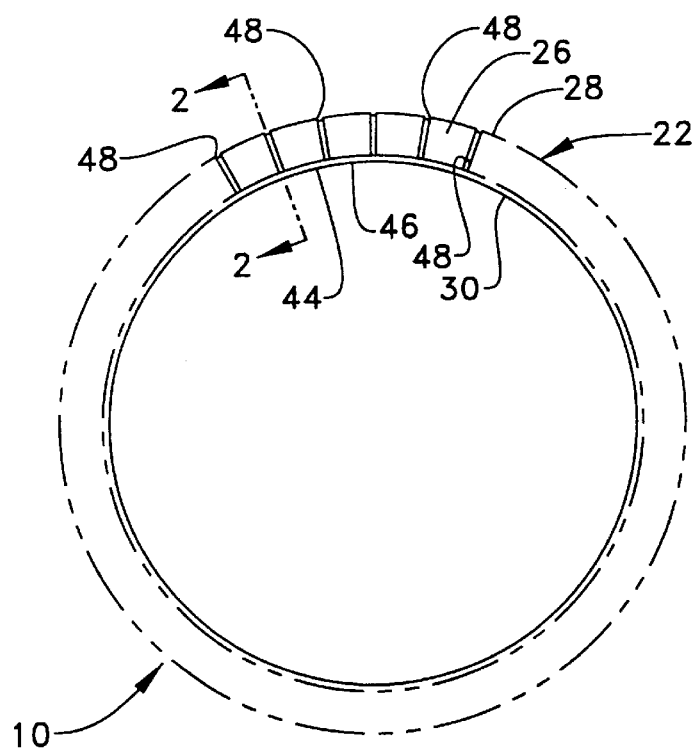
Fig_1_
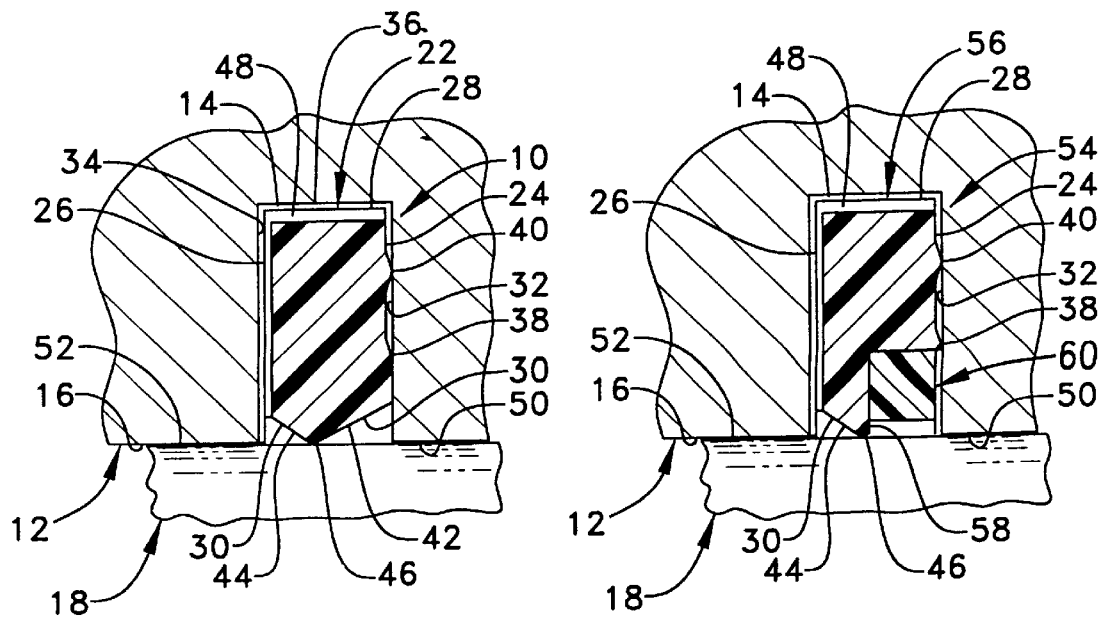
Fig_2_ Fig_3_

UNIDIRECTIONAL ROD SEALING RING FOR A HYDRAULIC CYLINDER

TECHNICAL FIELD

This invention relates generally to a sealing ring for forming a sealed condition around a member such as a piston rod, shaft or other member movable axially in a bore of a hydraulic cylinder, and, more particularly, to a unidirectional rod sealing ring for a hydraulic cylinder.

BACKGROUND ART

Older sealing rings known as buffer seals used for forming a sealed condition around a rod, shaft or other member axially movable in a bore of a hydraulic cylinder include urethane rings having rectangular or near rectangular cross-sectional shapes for providing a bi-directional sealing capability. However, these older bi-directional sealing rings have been found to have a tendency to trap hydraulic fluid or oil between themselves and adjacent sealing rings. This has been problematic because, at times, the trapped fluid or oil rose to a pressure sufficient to damage both the sealing ring and the adjacent seals.

Newer rod sealing ring constructions having a unidirectional sealing capability are also known, including multiple piece sealing rings having a stepped rigid PTFE sealing ring in combination with a more flexible elastomeric backing ring made from an elastomeric material such as rubber. Such unidirectional sealing rings reduce the occurrence of trapped oil between the buffer sealing ring and adjacent rings. However, the backing rings, in some instances, have been found to have a tendency to become permanently deformed under high pressure operating conditions. Additionally, these rings are significantly more expensive than the older bi-directional sealing rings.

Reference various rod and buffer sealing ring constructions and analogous sealing ring constructions disclosed in the following U.S. patents: Jamrus, U.S. Pat. No. 4,323,427, issued Apr. 6, 1982; Kashiwamura et al., U.S. Pat. No. 4,623,151, issued Nov. 18, 1986; Sugahara, U.S. Pat. No. 4,907,495, issued Mar. 13, 1990; Peppiatt et al., U.S. Pat. No. 5,088,745, issued Feb. 18, 1992; and Yamatani, U.S. Pat. No. 4,472,111, issued Sep. 18, 1984.

Accordingly, the present invention is directed to overcoming one or more of the problems as set forth above.

DISCLOSURE OF THE INVENTION

In one embodiment of the present invention, a unidirectional rod sealing ring adapted for forming a sealed condition in association with a member such as a piston rod or shaft axially movable in a bore of a hydraulic cylinder is disclosed. The present sealing ring includes an elastomeric ring member having an axially facing sealing face, an opposite axially facing pressure face, a circumferential radial outer surface, and a circumferential radial inner surface. The elastomeric ring member is cooperatively receivable in an annular groove around the bore of a hydraulic cylinder with the sealing face positioned in opposed relation to a first axial groove wall located in the groove, and the pressure face positioned in opposed relation to an opposite second groove wall. The sealed condition is formed by at least one continuous annular bead of relatively small radial extent extending around the sealing face, which bead is positioned for sealably engaging the first axial groove wall, and a radially inner most circumferential lip of relatively small axial extent on the radial inner surface positioned for sealably engaging the member axially movable in the bore.

Further, the pressure face and the radial outer surface include at least one passage thereacross for communicating the bore with the sealing face, which passage can comprise connecting grooves formed in the pressure face and outer surface; spaces around raised lettering on the pressure face and/or outer surface; or the like.

In operation, the circumferential lip, due to its small axial extent, provides good sealability with the axially movable rod or other member, with less frictional opposition to axial movement of the rod or other member compared to wider sealing lips. When a pressure condition in a portion of the bore of the hydraulic cylinder in communication with and acting against the pressure face is greater than a pressure condition in a portion of the bore in communication with and acting against the sealing face, the greater pressure condition in the first named bore portion is operable to urge the elastomeric ring member towards the first groove wall to sealably engage the at least one sealing bead with the groove wall, thereby forming a sealed condition around the groove wall which substantially limits or prevents the escape of fluid such as hydraulic fluid or oil from the pressurized first named bore portion through the groove to the lower pressure last named bore portion. Importantly, due to the small radial extent of the at least one sealing bead, high contact stress with the groove wall is achieved, thereby providing good static sealability even under low pressure conditions. When a pressure condition in the first named bore portion acting against the pressure face is less than a pressure condition in the second named bore portion acting against the sealing face, the sealing beads are sealably disengageable from the groove wall, to thereby allow fluid in the second named bore portion to flow between the at least one sealing bead and the first groove wall and through the passage or passages communicating the bore with the sealing face to the first named bore portion.

The present sealing ring is installable in a portion of a hydraulic cylinder such as a cylinder head, with the pressure face of the sealing ring in communication with a pressurizable or "inboard" end of the cylinder containing hydraulic fluid or oil, and the sealing face located in communication with the opposite "working" or outboard end of the cylinder. In operation, when the inboard end of the hydraulic cylinder is pressurized, the sealing ring substantially limits or prevents the outward flow or escape of the hydraulic fluid or other liquid from the cylinder. Then, when the pressure in the inboard end of the cylinder is lower than the outboard pressure, any oil that has escaped from the inboard end past the sealing ring can be drawn back into the inboard end and recovered by passage around the sealing ring.

The present sealing ring can optionally include a backing ring of more rigid material around its radial inner periphery to provide enhanced stiffness and prevent extrusion of the elastomeric ring member.

BRIEF DESCRIPTION OF DRAWINGS

FIG. 1 is an end view of a sealing ring according to the present invention;

FIG. 2 is a cross-sectional view of the sealing ring taken along line 2—2 of FIG. 1, and showing the sealing ring installed in an operative position in a groove extending around a bore of a hydraulic cylinder including a rod axially movable therein; and, FIG. 3 is a cross-sectional view of an alternative sealing ring construction including a backing ring according to the present invention, showing the sealing ring operatively installed in the groove of the hydraulic cylinder of FIG. 2.

BEST MODE FOR CARRYING OUT THE INVENTION

Referring to the drawings, FIGS. 1 and 2 show a sealing ring 10 constructed and operable according to the teachings of the present invention. Sealing ring 10 is shown in FIG. 2 installed in operative position in a hydraulic cylinder 12, in a an annular groove 14 extending around a bore 16 containing an elongate rod 18 movable axially therein, which axial movement is denoted by the arrow 20. Hydraulic cylinder 12 is exemplary of hydraulic cylinders utilized for a wide variety of purposes in association with tractors, earth moving equipment, and the like, groove 14 being located in any suitable portion of hydraulic cylinder 12, such as, but not limited to, a cylinder head of hydraulic cylinder 12.

Sealing ring 10 includes an elastomeric ring member 22 having an axially facing sealing face 24, an opposite axially facing pressure face 26, and a circumferential radial outer surface 28 and a circumferential radial inner surface 30 extending therebetween. Referring more particularly to FIG. 2, elastomeric ring member 22 is cooperatively receivable in groove 14 of hydraulic cylinder 12 with sealing face 24 positioned in opposed relation to a first axial groove wall 32 located in groove 14, pressure face 26 positioned in opposed relation to an opposite second axial groove wall 34 located in groove 14, and radial outer surface 28 located in opposed relation to a radially inwardly facing groove wall 36. Sealing face 24 includes two continuous annular raised beads of generally bulbous or rounded cross-section thereon, including a first bead 38 and a second bead 40, first bead 38 and second bead 40 each being of relatively small radial extent compared to the radial extent of sealing face 24 from radial outer surface 28 to radial inner surface 30, and bead 38 and bead 40 being positioned for sealably engaging first axial groove wall 32, as will be explained. Radial inner surface 30 includes a first tapered surface portion 42 extending radially inwardly from sealing face 24, and a second tapered surface portion 44 extending radially inwardly from pressure face 26, surface portion 42 and surface portion 44 converging at a radially inner most circumferential lip 46. Lip 46 is of relatively small axial extent compared to the overall axial width of radial inner surface 30 and is positioned for circumferential sealing engagement with rod 18 as shown. Additionally, pressure face 26 and radial outer surface 28 of elastomeric seal member 22 include a plurality of small grooves 48 thereacross, each groove 48 extending from sealing face 24 to surface portion 44 of radial inner surface 30, thereby communicating sealing face 24 with groove 14 radially outwardly around lip 46.

In operation, the circumferential sealable engagement between lip 46 of elastomeric ring member 22 and rod 18 separates bore 16 of hydraulic cylinder 12 into a first bore portion 50 in communication with surface portion 42 of radial inner surface 30 and at least that portion of sealing face 24 located radially inwardly of first bead 38, and a second bore portion 52 in communication with surface portion 44 of radial inner surface 30 and pressure face 26. Typically, sealing ring 10 will be installed in a groove, such as groove 14, such that first bore portion 50 will be to the outboard or working end of bore 16, and second bore portion 52 will be the inboard or pressurizable portion of bore 16. Thus, when a pressure condition exists in second bore portion 52 which is greater than a pressure condition that exists in first bore portion 50, the greater pressure condition will urge elastomeric ring member 22 towards first axial groove wall 32 such that first bead 38 and second bead 40 sealably engage first axial groove wall 32 thereby forming a sealed condition around groove 14. This sealed condition, in combination with the sealed engagement of lip 46 with rod 18, effectively prevents substantial, if any, flow of fluid such as hydraulic fluid, oil, or the like, located in second bore portion 52, to first bore portion 50, whether rod 18 is stationary or moving axially in groove 14 as denoted by arrow 20. Importantly, since first bead 38 and second bead 40 are each of relatively small or narrow radial extent, the surface area thereof for engagement with groove wall 32 is correspondingly small, such that relatively low pressures acting against substantially larger pressure face 26 will result in relatively high contact pressure between bead 38, bead 40, and groove wall 32, thereby effectively enabling sealing ring 10 to prevent hydraulic fluid or oil leakage therearound, even under low pressure conditions in second bore portion 52.

Also importantly, when pressure conditions in second bore portion 52 are less than pressure conditions in first bore portion 50, bead 38 and bead 40 are not urged into seal engagement with groove wall 34, thus enabling hydraulic fluid or oil in first bore portion 50 to be recovered by passage between bead 38, bead 40 and groove wall 34, and flow through grooves 48 to second bore portion 52. In some instances, the pressure condition in second bore portion 52 can be a negative pressure sufficient to pull or urge elastomeric ring member 22 away from groove wall 32 and to draw or suck hydraulic fluid or oil into second bore portion 52 from bore portion 50. Then, when the pressure condition in second bore portion 52 again exceeds the pressure condition in first bore portion 50, elastomeric ring member 22 will be urged towards groove wall 32 to sealably engage bead 38 and bead 40 with groove wall 32, as described above.

FIG. 3 shows an alternative sealing ring 54 constructed and operable according to the present invention, like portions of sealing ring 54 to portions of sealing ring 10 being identified by the same numerals. Sealing ring 54, like sealing ring 10 is installable in a groove 14 extending around a bore 16 of a hydraulic cylinder 12, in position for sealably engaging a rod 18 or other member axially movable in bore 16. Sealing ring 54 includes an elastomeric ring member 56 having a sealing face 24, an opposite pressure face 26, a radial outer surface 28, and an opposite radial inner surface 30, sealing face 24 including a continuous annular raised first bead 38 and a continuous annular raised second bead 40 thereon, both of generally bulbous or rounded cross-section and small radial extent, positioned to sealably engage groove wall 32 in groove 14 in the above-described manner. Additionally, pressure face 26 and radial outer surface 28 of elastomeric ring member 56 include a plurality of grooves 48 therein, which grooves 48 function as also described above. Radial inner surface 30 of elastomeric ring member 56 includes a tapered surface portion 44 extending from pressure face 26 to a radial inner most circumferential lip 46, but instead of a tapered surface 42, radial inner surface 30 includes a circumferential recess 58. Recess 58 is adapted for receiving a backing ring 60 made from a material more rigid than that of elastomeric ring member 56, such as a rigid polymeric material. In operation, sealing ring 54 provides the same sealing and fluid recovery functions as described above in connection with sealing ring 10, with the additional feature that when high pressure conditions are present in second bore portion 52, backing ring 60 is adapted to prevent or substantially limit extrusion of elastomeric ring member 56 through bore 16 around rod 18.

Here, it should be recognized that an important facet of the present invention is the sealability of first bead 38 and second bead 40 with first axial groove wall 32 under low pressure conditions located in second bore portion 52 and acting against pressure face 26. This low pressure sealability is achieved in substantial part by the small radial extent of first bead 38 and second bead 40, it being important to recognize that such small radial extent can be achieved with a wide variety of cross-sectional shapes in additional to the bulbous or rounded shapes shown, including, but not limited to frusto-conical cross-sectional shapes, rectangular cross-sectional shapes, ovoid cross-sectional shapes, and the like. It should also be recognized that a single bead, or a number of beads greater than the two shown can be provided on the sealing face of the present sealing ring, as desired. Similarly, radial inner surface 30 and lip 46 thereof can have a wide variety of different cross-sectional shapes, including rounded cross-sectional shapes, rectangular cross-sectional shapes, and the like, which provide the desired low frictional contact with rod 18 as discussed above.

Industrial Applicability

The present unidirectional sealing ring acts to reduce the magnitude of pressure reaching subsequent seals in a typical hydraulic cylinder arrangement. Additionally, the unidirectional sealing ring has utility for a wide variety of hydraulic cylinder and similar applications wherein sealability under low hydraulic pressure conditions, and containment and recovery of hydraulic fluid or oil, is desired, including hydraulic cylinder applications for tractors, earth moving equipment, excavating equipment, and the like, wherein pressure conditions in communication with opposite axial faces of the sealing ring can vary widely in operation, such as due to frequent reciprocal operation of the hydraulic cylinder, and under circumstances wherein high pressure spikes can occur, such as when an implement attached to the working end of the rod strikes an obstruction such as a rock when excavating and the like. Other aspects, objects and advantages of the present invention can be obtained from a study of the drawings, the disclosure and the appended claims.

What is claimed is:

1. A sealing ring for forming a unidirectionally sealed condition around a member axially movable in a bore of a hydraulic cylinder, the sealing ring comprising:

an elastomeric ring member having an axially facing sealing face, an opposite axially facing pressure face, a circumferential radial outer surface, and a circumferential radial inner surface, the elastomeric ring member being cooperatively receivable in an annular groove around the bore of the hydraulic cylinder with the sealing face positioned in opposed relation to a first axial groove wall located in the groove and the pressure face positioned in opposed relation to an opposite second groove wall, the sealing face having at least two continuous annular beads therearound of small radial extent positioned for sealably engaging the first axial groove wall, the radial inner surface having a radially inner most circumferential lip of small axial extent positioned for sealably engaging the member axially movable in the bore, the pressure face and the radial outer surface including at least one passage thereacross communicating the bore with the sealing face, and wherein when the elastomeric ring member is cooperatively received in the groove around the bore of the hydraulic cylinder and the groove is of greater axial extent than the elastomeric ring member a pressure condition in the bore of the hydraulic cylinder acting against the pressure face greater than a pressure condition in the bore acting against the sealing face is operable to urge the elastomeric ring member towards the first groove wall to sealably engage the at least two sealing beads with the first groove wall and a pressure condition in the bore acting against the pressure face less than a pressure condition in the bore acting against the sealing face is operable to urge the elastomeric ring member away from the first groove wall to allow fluid in the bore to flow between the at least two sealing beads and the first groove wall and through the at least one passage communicating the pressure face with the sealing face.

2. A sealing ring, as set forth in claim 1, wherein the radial inner surface of the elastomeric ring member includes a first tapered surface portion and an opposite second tapered surface portion which converge at the radially inner most circumferential lip.

3. A sealing ring, as set forth in claim 1, further comprising a backing ring of a more rigid material than the elastomeric ring member positioned for preventing the elastomeric ring member from being extruded into the bore of the hydraulic cylinder.

4. A sealing ring, as set forth in claim 1, wherein the at least one passage of the pressure face and the radial outer surface comprises a plurality of connecting grooves in the pressure face and the radial outer surface.

5. A sealing ring, as set forth in claim 1, wherein a pressure condition in the bore acting against the pressure face less than a pressure condition in the bore acting against the sealing face is operable to pull the elastomeric ring member away from the first axial groove wall.

6. A sealing ring, as set forth in claim 5, wherein the pressure condition in the bore acting against the pressure face is a negative pressure condition.

* * * * *